(No Model.)
D. BOURGEOIS.
FEED WATER HEATER AND PRECIPITATOR.
No. 271,025. Patented Jan. 23, 1883.
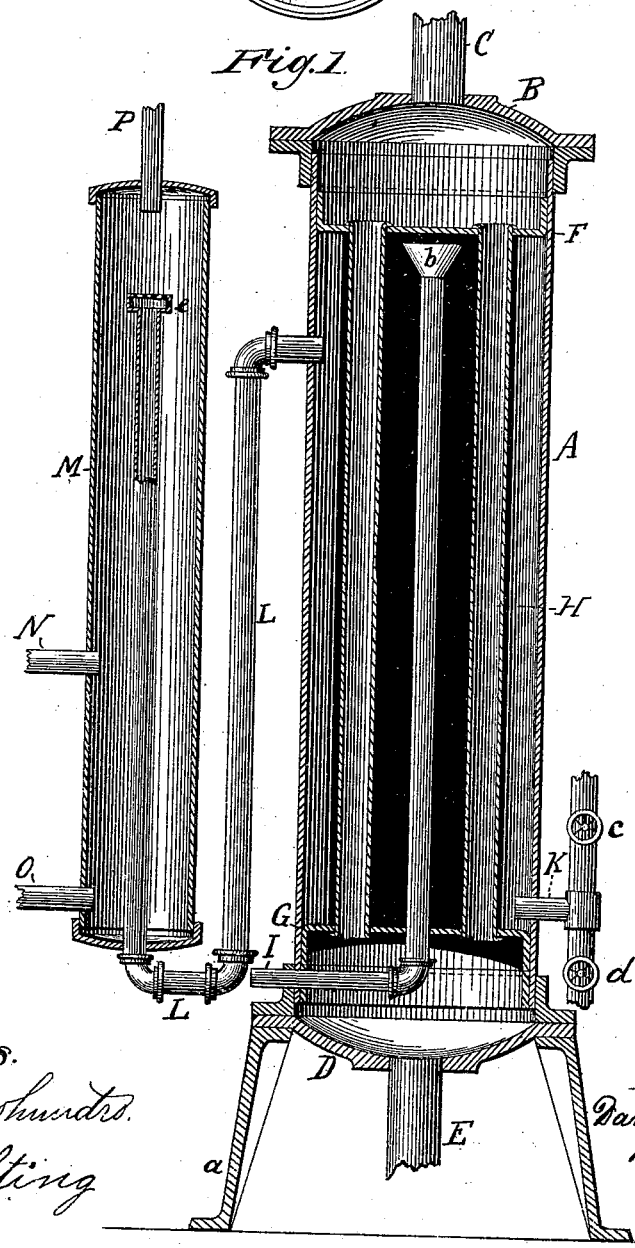

UNITED STATES PATENT OFFICE.

DAVID BOURGEOIS, OF CHICAGO, ILLINOIS, ASSIGNOR OF ONE-HALF TO KROESCHELL BROTHERS, OF SAME PLACE.

FEED-WATER HEATER AND PRECIPITATOR.

SPECIFICATION forming part of Letters Patent No. 271,025, dated January 23, 1883.

Application filed November 20, 1882. (No model.)

*To all whom it may concern:*

Be it known that I, DAVID BOURGEOIS, of Chicago, in the county of Cook and State of Illinois, have invented certain new and useful Improvements in Feed-Water Heaters and Precipitators; and I do hereby declare that the following is a full, clear, and exact description thereof, reference being had to the accompanying drawings, and to the letters of reference marked thereon, which form a part of this specification.

This invention has for its object to produce an apparatus in which the feed-water for boilers by the otherwise wasted heat of the exhaust-steam is brought to a highly-heated temperature, and in which such water is separated from all impurities and sediments before entering the boilers; and it consists of the novel devices and combinations of devices hereinafter described and specifically claimed.

In the accompanying drawings, Figure 1 represents a vertical section through the center line of the apparatus, and Fig. 2 a sectional plan of the feed-water heater.

Corresponding letters in the several figures of the drawings designate like parts.

A denotes the cylindrical heater-shell, that has flanges to its ends for securing the cap-plate B, to which the exhaust-pipe C of the engine is connected, and the base-plate D, to which the exhaust-steam escape-pipe E is connected, and to which are secured legs $a$, that support such heater in an upright position. This shell A has a top diaphragm, F, and a bottom diaphragm, G, and both these diaphragms F and G are connected by a series of boiler-flues, H, through which the exhaust-steam on its passage from pipe C to pipe E must pass. Through the side of the shell and through the center of the bottom diaphragm, G, is inserted a pipe, I, which extends upward to near the top diaphragm, F, where it is provided with a funnel, $b$, for collecting and drawing off from time to time any vegetable or animal impurities that will float on the surface of the water, and that would be liable to create foaming in the boilers. Externally of the heater this pipe I should be provided with a suitable blow-off valve.

K is the cold-water feed-pipe, that is tapped into the bottom of the shell A, close above diaphragm G, and connects with the feed-pump or injector. This pipe K is provided with valve $c$ for shutting off the feed, and with a branch having a valve, $d$, for blowing off any sediments that may collect in the bottom of the heater.

L is a pipe leading from near the top of the heater downward into and through the bottom of a smaller cylindrical vessel, M, which I call the "precipitator." This pipe L reaches to near the top in vessel M, where it is provided with a perforated head that will eject the feed-water in a spray, and into the cap of the vessel M is tapped the end of a pipe, P, which is to connect with the steam-space of the boiler that is to be fed with the water.

A pipe, N, connects the upper end of the vessel M with the water-space in the boiler, and a pipe, O, is for blowing off the mineral and alkaline sediments that will be precipitated. Such pipe O for that purpose is to be provided with a cock or valve.

The cold water entering the bottom of vessel A, while the exhaust-steam enters the top of the vessel and passes downward through the flues, the water in such vessel will not be agitated or caused to circulate, but will rise slowly, and will be brought to a higher degree of temperature proportionately as it approaches the top of the heater, whence it is drawn off into the vessel M, thereby separating all impurities according to their specific gravity, which then can be drawn off from time to time—the scum through pipe I and the sediments through valve $d$. The feed-water thus having been brought in the heater to a temperature within a degree or two of the temperature of the exhaust-steam, and having been cleared of the scum and earthy impurities, it is passed into the vessel M, where it enters in an upward spray that is brought in direct contact with live steam from the boiler, thus raising its temperature to that of the water in the boiler, and precipitating all alkaline substances that are contained in the water before such water is allowed to enter the boilers, whereby the boilers not only are fed with boiling water under pressure, but also are kept free from incrustation that very seriously affects the conduction of heat, and is the frequent cause of boiler explosions.

The escape of the exhaust-steam in its passage through the flues in the heater is not only not to any extent obstructed, but such steam, in yielding its heat to the feed-water, will be condensed in a certain measure, and will become less in volume, so as to reduce the back-pressure on the engine piston.

With introducing the steam into the heater from above in a manner to bring it in close proximity with the hottest water first, the temperature of such water can be raised faster and higher than when such steam is introduced into the bottom of the heater.

The vessel M can be applied without the heater A, particularly with boilers that furnish steam for condensing-engines.

What I claim is—

1. A heater consisting of shell A, cap B, with exhaust-pipe connection C, base D, with exhaust-nozzle E, diaphragms F and G, with flues H, scum-pipe I, water-inlet pipe K, and water-escape pipe L, all constructed and arranged substantially as described, to operate as specified.

2. The feed-water heater and precipitator M, provided with perforated head e, that connects with the water-supply pipe L for injecting water in a spray, and having pipe P that connects with the steam-room of the boiler and brings live steam from the boiler in direct contact with such spray of feed-water, all substantially as and for the purpose specified.

3. The precipitator M, having feed-water inlet-pipe L, with perforated head e and blow-off pipe O, and being connected with the boiler by water-pipe N and steam-pipe P, the same being constructed and arranged to operate substantially as and for the purpose set forth.

4. The combination, with a feed-water heater, of the precipitator M, having feed-water inlet-pipe L, with perforated head e and blow-off pipe O, and being connected with the boiler by water-pipe N and steam-pipe P, the same being constructed and arranged to operate substantially as and for the purpose set forth.

In testimony that I claim the foregoing as my invention I affix my signature in presence of two witnesses.

DAVID BOURGEOIS.

Witnesses:
   H. W. HUEHL,
   R. G. SCHMID.